(12) United States Patent
Kees et al.

(10) Patent No.: US 7,793,993 B2
(45) Date of Patent: Sep. 14, 2010

(54) COUPLING DEVICE FOR A FLUID LINE

(75) Inventors: Ulrich Kees, Homburg (DE); Harald Röhrig, Spiesen-Elversberg (DE)

(73) Assignee: Festo AG & Co. KG, Esslingen (DE)

( * ) Notice: Subject to any disclaimer, the term of this patent is extended or adjusted under 35 U.S.C. 154(b) by 0 days.

(21) Appl. No.: 12/077,262

(22) Filed: Mar. 18, 2008

(65) Prior Publication Data
US 2008/0238096 A1 Oct. 2, 2008

(30) Foreign Application Priority Data
Mar. 30, 2007 (DE) .................... 10 2007 015 406

(51) Int. Cl.
*F16L 21/06* (2006.01)
(52) U.S. Cl. .................. 285/323; 285/322; 285/340
(58) Field of Classification Search .............. 285/322, 285/319, 340, 244, 39, 323
See application file for complete search history.

(56) References Cited

U.S. PATENT DOCUMENTS

| | | | | |
|---|---|---|---|---|
| 2,784,987 | A | * | 3/1957 | Corcoran .................... 285/82 |
| 4,257,629 | A | * | 3/1981 | Maple et al. ................ 285/12 |
| 4,394,024 | A | * | 7/1983 | Delhaes ..................... 277/619 |
| 4,630,690 | A | | 12/1986 | Beasley et al. |
| 4,660,803 | A | | 4/1987 | Johnston et al. |
| 4,739,126 | A | * | 4/1988 | Gutter et al. ................ 174/78 |
| 4,951,975 | A | * | 8/1990 | Bartholomew ............ 285/111 |
| 5,029,908 | A | * | 7/1991 | Belisaire ................... 285/323 |
| 6,089,912 | A | * | 7/2000 | Tallis et al. ................ 439/584 |
| 6,153,830 | A | * | 11/2000 | Montena .................. 174/88 C |
| RE38,786 | E | * | 8/2005 | Guest .......................... 285/24 |
| 7,086,897 | B2 | * | 8/2006 | Montena .................... 439/578 |
| 7,300,309 | B2 | * | 11/2007 | Montena .................... 439/578 |
| 2005/0006896 | A1 | * | 1/2005 | Naito et al. ................ 285/316 |

FOREIGN PATENT DOCUMENTS

| | | |
|---|---|---|
| DE | 40 02 057 | 2/1991 |
| DE | 100 58 967 | 5/2002 |
| DE | 10 2005 017 692 | 5/2006 |
| EP | 0 811 801 | 12/1997 |
| EP | 1 038 138 | 9/2000 |

OTHER PUBLICATIONS

Pending U.S. Appl. No. 12/075,088, filed Mar. 7, 2008, by inventor Kees et al.

* cited by examiner

*Primary Examiner*—James M Hewitt
*Assistant Examiner*—Gwendolyn D Fournet
(74) *Attorney, Agent, or Firm*—Hoffman & Baron, LLP (57) ABSTRACT

A coupling device for a fluid line has a collet and an axially movable actuating sleeve serving for operation of the collet. The collet bears several gripping teeth with associated actuating portions able to be acted on by actuating faces on the actuating sleeve in order to hold the inserted fluid line. In the non-operated state of the actuating sleeve there are at least partly different distances between the mutually associated actuating portions and actuating faces so that on actuation of the actuating sleeve several actuating portions of the collet are acted on one after the other. This means that the necessary actuating force is reduced.

27 Claims, 5 Drawing Sheets

COUPLING DEVICE FOR A FLUID LINE

FIELD OF THE INVENTION

The invention relates to a coupling device for a fluid line comprising a sleeve-like collet bearing against a main body axially and into which a fluid line to be coupled may be coaxially inserted and which has a plurality of axially extending support arms distributed in the peripheral direction and each bearing at least one radially inwardly extending gripping tooth, a plurality of gripping teeth being associated with different actuating portions provided on the collet such portions being able to be actuated by axial displacement of an actuating sleeve arranged around the collet by actuating faces disposed on the sleeve in order to thrust the gripping teeth radially inward to perform a clamping operation radially inwardly and clamp same against the outer periphery of the inserted fluid line.

BACKGROUND OF THE INVENTION

A coupling device disclosed in the European patent publication EP 1038138 B1 of this type comprises a sleeve-like collet with a meandering shape having gripping teeth distributed on two axially spaced clamping areas. The gripping teeth are arranged on axially extending support arms of the clamping sleeve and function as actuating portions able to be respectively acted on by an actuating face arranged on the inner periphery an actuating sleeve encircling the collet, when the actuating sleeve is shifted axially out of a non-actuated position. The actuating faces are in this case portions of an annular face formed on the inner periphery of the actuating sleeve. Since in the case of this coupling device a relatively large number of gripping teeth must be operated, a relatively large actuating force at the actuating sleeve is required.

A similar situation exits in the case of coupling device disclosed in the German patent publication 10058967 A1, which differs from the above described one essentially in that the collet is made up of two collet elements able to be inserted into each other.

In the case of coupling device described in the European patent publication EP 0811801 A1 there is a thrust ring slotted from either end which is clamped between a main body and a actuating sleeve. On operation of the actuating sleeve the gripping teeth formed by the end portions are simultaneously bent inward radially and braced against the inserted fluid line. In this case as well the actuating force necessary for the actuating sleeve is relatively large so that for its actuation it is best to employ a tool.

In the case of the plug-in fitting described in the German patent publication DE 40 02 057 A1 an axially moving collet is employed having a plurality of axially extending support arms on which respectively one head portion is mounted in a pivoting manner, said head portion having two axially spaced gripping teeth. On shifting the collet a stationary actuating sleeve is thrust against the head portions so that the gripping teeth arranged thereon are simultaneously thrust radially inward. In order to ensure that the gripping teeth may take a proper hold on the fluid line, in this case the collet must be shifted applying a relative heavy force and this makes handling inconvenient.

The German patent publication DE 10 2005 017 692 B3 finally discloses a coupling device in the case of which several components resiliently of a cage element are used. The required holding force in this case comes from the build up of return force, when the gripping teeth are spread apart by the inserted fluid line. For release of the connection the gripping teeth are able to be acted on by means of an axially sliding release sleeve so that they come clear of the outer periphery of the fluid line. In the course of this release operation all gripping teeth simultaneously lift clear of the fluid line. A disadvantage of this coupling device is inter alia also that owing to lack of any active actuation of the gripping teeth it is not always possible to ensure a proper engagement with the inserted select, if its outer dimensions are subject to substantial manufacturing errors. In this case a coupling device is substantially more secure as regards its functions, if it has a actuating sleeve acting actively on a collet, there furthermore then being no relaxation problems as regards the gripping teeth which are normally elastically attached.

SUMMARY OF THE INVENTION

One object of the present invention is to design a coupling device which may be operated relatively easily even in the case of a relatively large number of gripping teeth.

In order to achieve this aim there is a provision such that the actuating portions provided on the collet and the actuating faces, associated with the actuating portions, of the actuating sleeve in the non-operated position of the actuating sleeve are at least partly, in the shifting direction of the actuating sleeve, so differently spaced from each other that in the case of the operation of the actuating sleeve several actuating portions of the collet are acted temporally one after the other.

In the course of displacement of the actuating sleeve for the purpose of causing the clamping action accordingly all gripping teeth are not simultaneously operated. Instead there is operation in a timed succession of the actuating portions so that the force required for operation is distributed. It is more particularly possible to ensure that one or more gripping teeth are firstly operated with the necessary maximum force, after the maximum force required for the operation of one or more gripping teeth has been applied. In principle an arrangement would be possible such that all actuating portions are operated in a timed succession on displacement of the actuating sleeve. More particularly for reasons of convenience of manufacture it is however preferred to arrange the gripping teeth, which are to be operated at different points in time, in groups of teeth so that teeth in the same tooth group are worked at the same time. It will be clear that the actuation operations on different teeth may certainly be staggered in time, an arrangement however being possible such that simultaneous application of the necessary maximum force is avoided. In any case with the arrangement of the actuating portions in keeping with the invention and the associated actuating faces a relatively free-running operation may be ensured independently of the number gripping teeth present, while simultaneously producing heavy clamping forces adjacent to individual gripping teeth.

Advantageous developments of the invention are defined in the dependent claims.

As already indicated it is more particularly convenient if at least two axially spaced tooth groups are provided on the collet, the two tooth groups having their own actuating portions, which in the non-actuated condition of the actuating sleeve are so spaced from the actuating faces thereon that the gripping teeth of the two groups are operated on displacement of the actuating sleeve in succession, the gripping teeth in one same group being operated simultaneously.

It is an advantage for the gripping teeth present to be limited to just two axially spaced tooth groups.

Each gripping tooth may be provided with its own actuating portion individually. This ensures mutually independent activation of the gripping teeth and avoids interference between the teeth.

It is convenient if each actuating portion is provided with its own actuating face on the actuating sleeve individually. For instance, for each actuating portion an axially extending guide groove may be present on the inner periphery of the actuating face, the floor of the groove being the actuating face. The actuating face may in this case for example be a slanting face portion of the groove floor.

Owing to the actuating portions running in the guide grooves it is possible furthermore for a means preventing rotation of the actuating sleeve to be provided.

An optimum mobility of the gripping teeth is to be had if they are connected with the aid of individually associated connecting portions in a radially elastic manner on the respectively associated support arm. The connecting portions in this case conveniently function at the same time as actuating portions. It is an advantage in this respect that the mobility of the gripping teeth is practically independent of the yielding properties of the support arms so that no particular requirements arise here as regards radial yield. Nevertheless it is naturally an advantage if the support arms as well as a whole possess resiliently elastic properties in a radial direction.

In order to provide for a sure hold on an inserted fluid line even on in the event of vibrations or other effects, it is to be recommended to provide detent means, which entail a releasable catch action between the collet and the actuated actuating sleeve.

As detent means it is possible for example to utilize one or more actuating portions. The respective actuating portions may then protrude radially outward beyond the support arms so that they may fit into detent recesses at the inner periphery of the actuating sleeve.

In order to produce axially spaced apart gripping teeth at least two suitably spaced gripping teeth are preferably provided on at least some and more particularly all support arms. In this respect it is an advantage, if the gripping teeth arranged of the same support arm are offset in relation to one another in the peripheral direction of the collet. The latter feature ensures an even distribution of the points of engagement between the gripping teeth and the fluid line along the outer periphery of the latter.

A particularly expedient design of the collet provides for an annular base portion from which all the support arms project with connections between them in the same axial direction, the gripping teeth being placed in front of the base portion with an axial clearance. If one support arm is provided with several gripping teeth, it is preferred for a front gripping tooth to be placed as an axial extension of the support arm at its free end, while at least one further gripping tooth is located between the front gripping tooth and the base portion laterally on the support arm. The further gripping tooth may in particular be held on the associated support arm in particular by means of a connecting rib extending in the peripheral direction of the collet.

In any case it is advantageous if the collet is so arranged on the main body that the support arms have their free ends extending axially outward in a direction opposite to the direction of insertion.

It is an advantage too if the collet is axially secured on the main body. For this purpose it is convenient for the base portion to be employed so that the mobility of the support arms is not restricted.

Although the collet may in principle also be manufactured of plastic material, it is preferred more especially to manufacture it of metal, in particular in the form of an integral stamped and bent component.

The main body may for example be the wall of a fluid power device, for instance of a valve or a fluid power drive. A separate housing body to receive the collet is accordingly unnecessary. There is also the possibility however of designing the main body as an individual component on its own, which is provided with attachment means such as a mounting screw, which renders possible attachment to a specially provided interface for a fluid power device. The main body may in this case readily be made in several parts, as for example in order to allow tilting.

In the following the invention will be explained in detail with reference to the accompanying drawings.

DETAILED DESCRIPTION OF THE PREFERRED EMBODIMENTS

Figure 1:
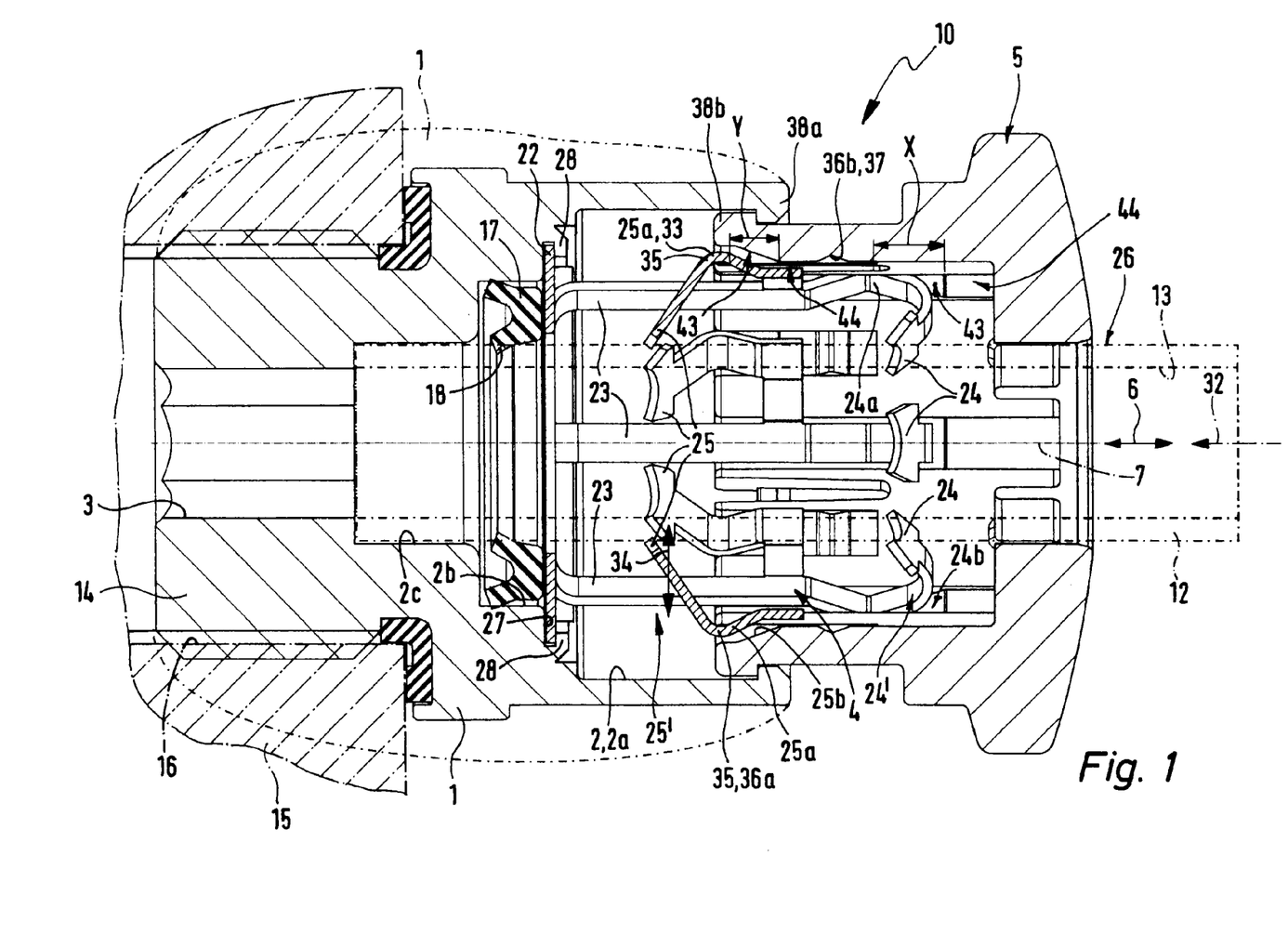
FIG. 1 shows a preferred embodiment of the coupling device of the invention in a longitudinal section whose plane is indicated by the section line I-I in FIGS. 4 and 8, a fluid line inserted for connection being indicated in chained lines and the actuating sleeve being depicted in the non-actuated state.

The coupling device generally referenced 10 comprises a main body 1 in which a socket 2 opening at an outer face and preferably with a circular cross section is formed which preferably coaxially is adjoined by a fluid line 3 extending in the main body 1. In the socket 2 a collet 4 with a sleeve-like configuration us placed and at least a part of its length is coaxially received in the socket. An actuating sleeve 5, which is coaxial in relation to the collet 4, encircles the collet 4 and in relation to the same and to the main body 1 is able to be shifted with a movement 6 indicated by a double arrow. The displacement direction extends axially, i.e., in the direction of the common longitudinal axis 7 of the socket 2, of the collet 4 and of the actuating sleeve 5.

A fluid line 12, indicated in chained lines, is introduced into the socket 2 through the actuating sleeve 5 and the collet 4 and it may be restrained in the inserted state by the collet 4. The fluid duct 13 formed in it communicates in the inserted state with the fluid duct 3 in the main body 1 so that to this extent there is now a fluid connection.

The coupling device 10 may be designed as an independent subassembly, whose main body 1 is able to be secured by an attachment portion 14 to a fluid power device 15, as for example a fluid operated drive or a valve, which is only depicted in part. The attachment portion 14 is for example a screw threaded spigot, which is able to be screwed into a connection opening 16 with a female thread in the fluid power device 15 in order to produce a connection of the fluid duct 3 with the device duct belonging to the connection opening 16. As an alternative to this the attachment portion 14 might for example also be designed for assembly by plugging or by producing a press fit. Though in the present example it is located on the rear side of the main body 1 opposite to the socket 2, it could for example also be constituted by the portion containing the socket 2 so that the main body 1 is able to be retracted in a connection opening 16 provided for it, at least for the greater part of its length.

The main body 1 may furthermore be of multi-part design, for example to constitute a pivoting screw arrangement. The attachment portion 14 would then be located on a first part of the main body 1, on which a second main body part having the socket 2 is arranged in a pivoting fashion.

In the case of a further embodiment, which is indicated in chained lines in FIG. 1, the main body is constituted directly by the wall of a fluid power device so that it is possible to do without any additional and independent main body.

The fluid line 12 to be connected may be a flexible hose or also a rigid pipe of plastic material or of metal.

The socket 2 possesses an axially external receiving portion 2a in which the collet 4 is secured, preferably in a manner precluding axial movement. In an axially inward direction it is adjoined by a further receiving portion 2b with a reduced diameter, which receives an annular receiving portion 2b with a reduced diameter which has an annular seal 17 in it, preferably a so-called groove ring. The seal 17 makes sealing contact with the outer periphery of the inserted fluid line, preferably at a radially resilient sealing lip 18 which is in a position to allow for even large inaccuracies in diameter of the fluid line 12. In other respects the seal 17 furthermore makes sealing contact with the main body 1 so that leakage of fluid is not possible.

It is to be noted at this point that the coupling device 10 may be connected both with fluid lines 12 for liquid media and also for gaseous fluids, more particularly compressed air.

The further receiving portion 2b is axially adjoined by a receiving portion 2c with a reduced diameter which simultaneously may function as a centering portion since it receives the front end portion of the inserted fluid line 12. Its diameter may more particularly be the same as that of the outer face of the fluid line 12.

Figure 2:
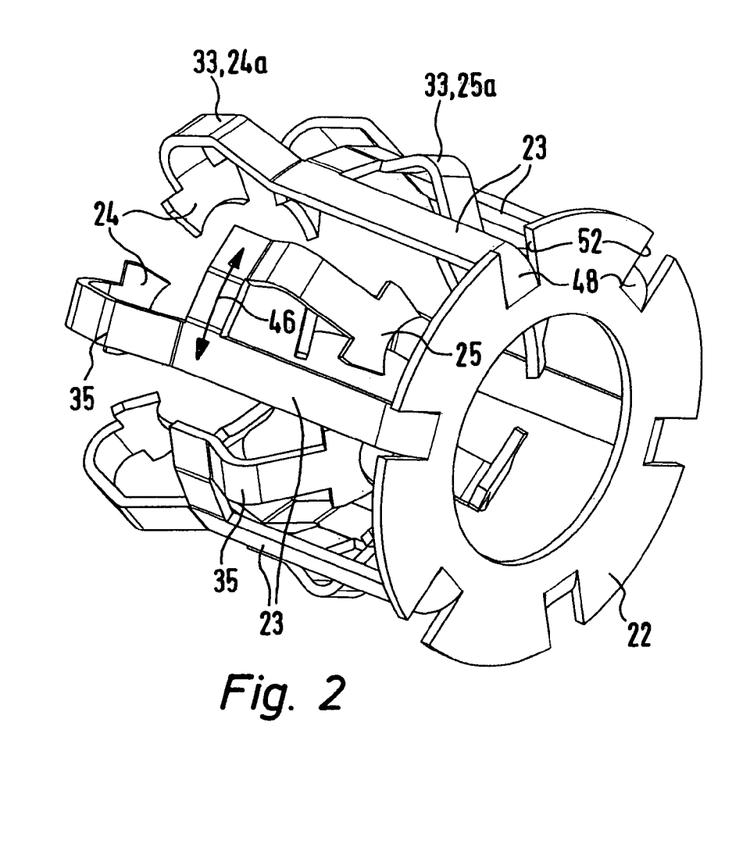
FIG. 2 is a perspective, separate view of the collet employed in the coupling device of FIG. 1 as seen from the rear.
Figure 3:
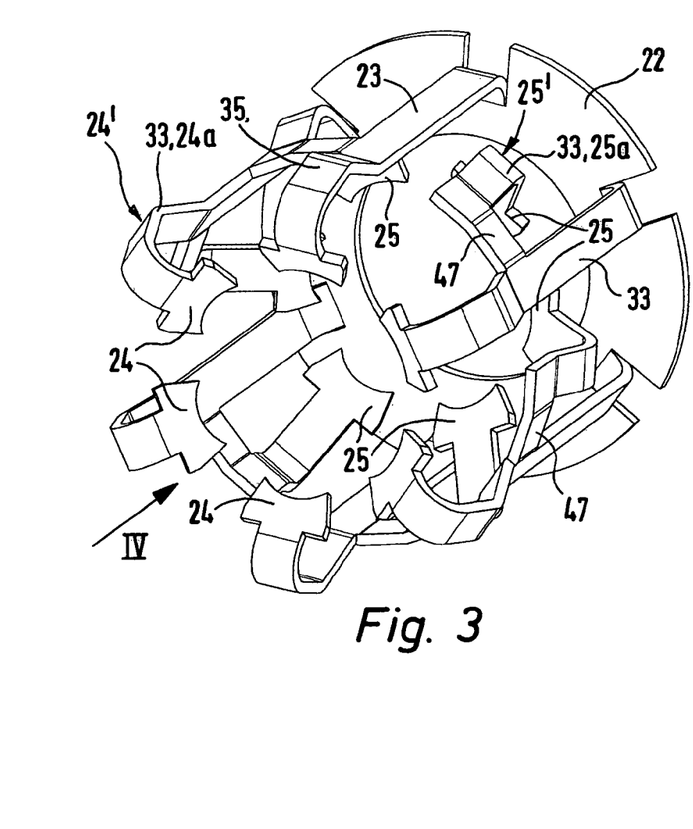
FIG. 3 shows the collet of FIG. 2 in a perspective elevation as viewed from the front side.

At one end the collet 4 preferably has an annular and preferably disk-like flat base portion 22, from which support arms 23 extend in the same axial direction along the periphery of the collet 4 with arms 23 distributed and spaced apart along the periphery of the collet 4. Apart from their base portion 22 the support arms 23 are not joined together and more particularly do not bear against each other. This provides for a mutually independent flexibility in the radial direction in relation to the longitudinal axis 7.

The support arms 23 bear, with an axial clearance from the base portion 22, radially inwardly extending gripping teeth 24 and 25. They are designed to be braced against the outer periphery 26 of the inserted fluid line 12 to avoid its being pulled out by accident.

The collet 4 is introduced into the socket 2 with its base portion 22 to the fore and bears at such base portion 22 in an axial direction against the main body 1. Preferably the collet 4 is furthermore axially fixed in position in relation to the main body 1 in an immovable fashion, the corresponding fixation occurring at the base portion 22. The base portion bears in the present example against the annular floor face 27 of the further receiving portion 2b encircling the further receiving portion 2b, of the outer receiving portion 2a and here it is held by several holding claws 28 on the main body 1, which are crimped radially inward and extend axially outward in front of the base portion 22. However other attachment means are possible too.

The inner diameter of the base portion 22 is smaller than the diameter of the further receiving portion 2b so that it radially covers the latter somewhat. It therefore extends axially on the outside in front of the annular seal 17 and supports it to avoid accidental deformation thereof. Accordingly the arrangement ensures that the seal 17 cannot be deformed so much even with a high internal pressure so far that it comes clear in the outer periphery 26 of the fluid line 12.

The support arms 23 slant from the base portion 22 in a direction opposite to the direction of insertion 32 as indicated by an arrow of the fluid line 12 axially outward, it being possible for them to protrude axially beyond the socket 2.

It is an advantage if the support arms 23 extend at least substantially parallel to the longitudinal axis 7.

Figures 4, 5, 6:
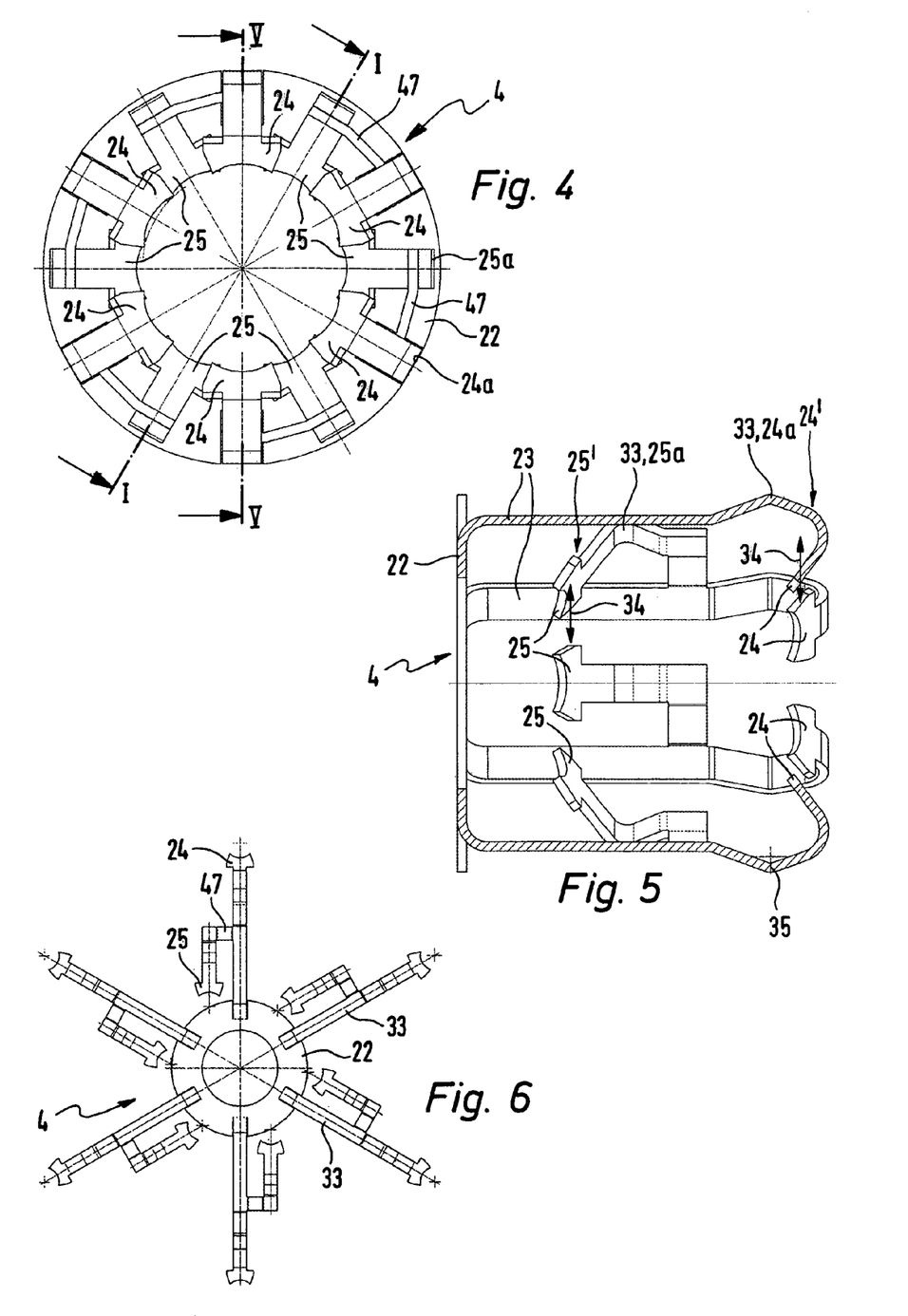
FIG. 4 is a front view of the collet looking in the direction of the arrow IV in FIG. 3.
FIG. 5 is a longitudinal section taken through the collet on the section line V-V of FIG. 4.
FIG. 6 is a plan view of the stamped and bent component employed in the manufacture of the collet prior to bending.

Preferably the gripping teeth 24 and 25 are collected together as two tooth groups 24' and 25' spaced from each other in the direction of the longitudinal axis 7. The first gripping teeth 24 of the first toot group are further removed from the base portion 22 axially than the second gripping teeth 25 belonging to the second tooth group 25'.

However it is an advantage if the gripping teeth 24 or 25 belonging to the same tooth group 24' or 25' lie at the same axial level. This is so with the working example. In principle however within the individual tooth groups 24' and 25' an additional axial offset could be present between the individual gripping teeth.

Each gripping tooth 24 and 25 is preferably attached by way of a resiliently elastic mounting portion 33 in a radially resilient manner on the associated support arm 23. The gripping teeth 24 and 25 are consequently in each case able to move radially in relation to the support arm 23 bearing them as indicated by the double arrows 34. The radial motion may take place as part of a small pivoting movement.

Each gripping tooth 24 and 25 is provided with an actuating portion 24a and 25a belonging to the collet 4. The actuating portion is so fashioned that the associated gripping tooth 24 or 25 is thrust radially inward toward the outer periphery 26 of the fluid line 12, when a suitably directed actuating force is applied to it. Each gripping tooth 24 and 25 is suitably kinematically coupled with its own particular actuating portion 24a and 25a and is more particularly fixedly joined to it.

Preferably the actuating portions 24a and 25a are directly formed by the above mentioned mounting portions 33. This simplifies the design of the collet 4.

The actuating portions 24a and 25a are in particular so designed that they project radially outward past the support arms 23. In the example they have a cranked configuration and more particularly a V-like structure so that there is in each case a radially outwardly directed raised portion, that is to say a ridge portion 35. This results in a radially exposed position of the actuating portions 24a and 25a standing proud of the support arms 23 so that for actuation by the actuating sleeve 5 they are quite accessible.

The actuating sleeve 5 is mounted in an axially sliding manner on the main body 1 to render possible a displacement movement 6. As compared with a screw bearing or a bayonet attachment, which would also be possible, this design leads to simpler handling and simpler manufacture. In order to clamp an inserted fluid line 12 the actuating sleeve 5 must only be axially slid out of the non-actuated position illustrated in FIG. 1 toward the interior of the socket 2 until it assumes an actuated position, in which by acting on all actuating portions 24a and 25a the gripping teeth 24 and 25 are thrust radially inward and pressed against the outer periphery 26 of the fluid line 12.

In the course of the clamping action then occurring the gripping teeth 24 and 25, which are preferably fashioned of a material harder than that of the fluid line 12, preferably bite to a minimum extent in the wall of the fluid line 12 and effectively grasp it. Accordingly the fluid line 12 is not only secured by a frictional engagement but also in an interlocking manner.

In this respect it is convenient for the gripping teeth 24 and 25 to have an oblique form slanting toward their front side directly cooperating with the fluid line 12, i.e. obliquely radially inward and simultaneously axially inwardly. The consequence of this is that the gripping teeth 24 and 25 make an enhanced gripping engagement with the fluid line 12 in a direction opposite to the direction of insertion 32, because their actuating portions 24a and 25a bear against the actuating sleeve 5.

If the inserted fluid line 12 is to be released again it is sufficient to pull back the actuating sleeve 5 into the non-actuated state. Owing to its resiliently elastic mounting portions the gripping teeth 24 and 25 then automatically move radially clear in an outward direction and release the fluid line 12.

Figure 7:
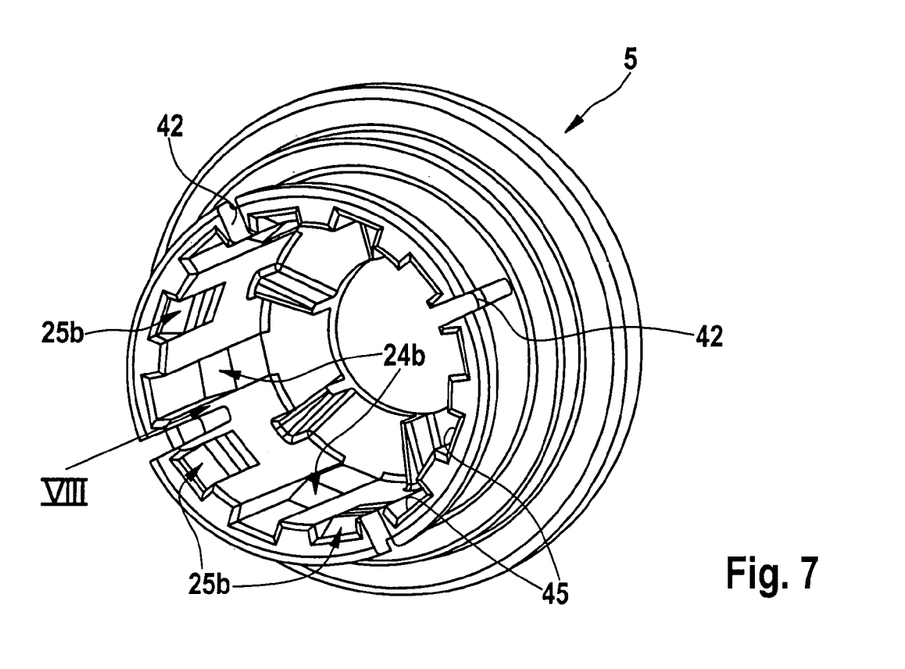
FIG. 7 is a separate perspective view of the actuating sleeve looking into the interior thereof from the side of the collet.
Figure 9:
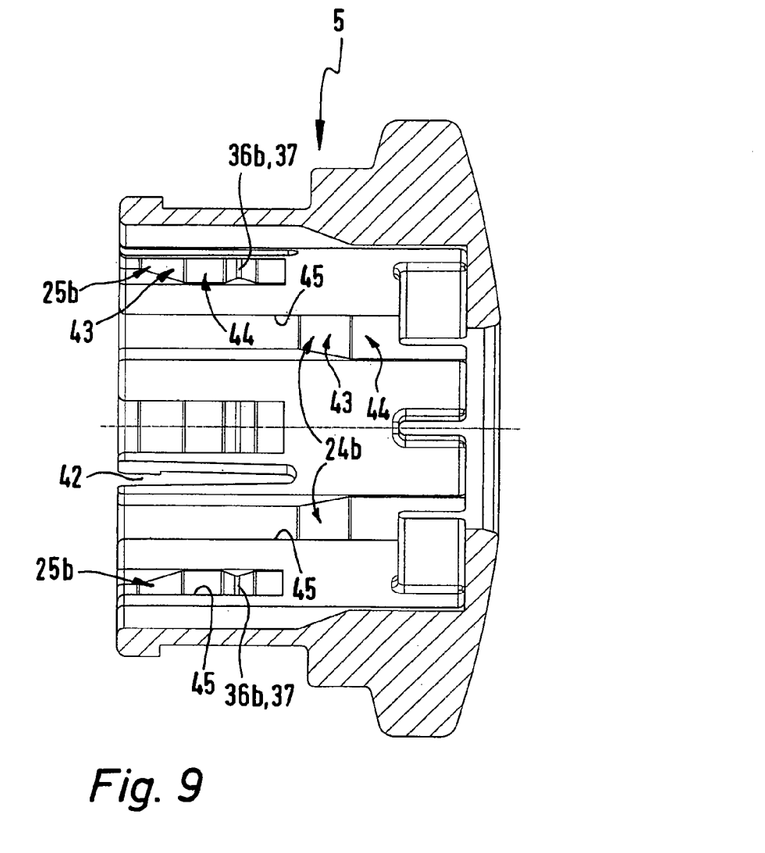
FIG. 9 is a longitudinal section taken through the actuating sleeve on the section line IX-IX in FIG. 8.

To avoid accidental release from the actuating position of the actuating sleeve 5 detent means 36a and 36b may be present. Such detent means 36a and 36b serve to ensure in the working example a detachable detent acting between the actuating sleeve 5 unit collet 4. Preferably the collet 4 has first detent means 36a on it extending from the ridge portions 35 of the second actuating portion 25a belonging to the second gripping teeth 25, whereas as second detent means 36b detent wells 37 are present on the inner periphery of the actuating sleeve 5, into which the ridge portions 35 may fit in the actuating position of the actuating sleeve 5.

The actuated position of the actuating sleeve 5 may also be termed an actuated position, because in this case it acts in an actuating manner on the actuating portions 24a and 25a.

The axial sliding displacement of the actuating sleeve 5 takes place preferably between the same and the main body 1. In the working embodiment the actuating sleeve 5 moves coaxially into the socket 2 and is guided in a sliding manner on its inner periphery.

A radially inwardly projecting annular collar 38a on the main body 1 in the outer opening portion of the socket 2 is hooked at the rear by a radially outwardly projecting annular collar 38b on the actuating sleeve 5 so that the actuating sleeve 5 cannot be completely withdrawn from the socket 2. The non-actuated position is defined when the two annular collars 38a and 38b axially engage each other. In order to ensure that the actuating sleeve 5 may nevertheless be mounted without any problems, its longitudinal portion into the socket 2 is provided with several longitudinal slots 42 at positions distributed about its periphery, which allow a slight elastic radial deformation.

For acting on the actuating portions 24a and 25a corresponding actuating faces 24b and 25b are provided on the inner periphery of the actuating sleeve 5. Such faces each have in the working example a face portion 43 inclined in relation to the direction 6 of shifting, such face portion 43 being placed in front of the associated actuating portion 24a and 25a in the non-actuated state of the actuating sleeve 5 axially outward and furthermore a straight face portion 44 parallel to the longitudinal axis 7 and adjoining the sleeve 5 in an axially outer direction.

The inclined face portions 43 are directed obliquely axially inwardly, their distance from the longitudinal axis 7 decreasing axially in an outward direction. The radial distance of the straight face portions 44 from the longitudinal axis is essentially equal to the distance between this longitudinal axis 7 and the support arms 23.

The first and the second actuating portions 24a and 25a are offset in relation to one another according to the first and the second gripping teeth 24 and 25 in the direction of the longitudinal axis 7. Accordingly there are first actuating faces 24b arranged on the actuating sleeve 5 for cooperation with the first actuating portions 24a and they are axially spaced from second actuating faces 25b, which cooperate with the second actuating portions 25a.

When the actuating portions 24a and, respectively, 25a belonging to a respective tooth group 24' and 25' are at the same level axially, the associated actuating faces 24b and 25b may be formed in principle by portions of an annular face extending on the inner periphery of the actuating sleeve 5 and centered on the longitudinal axis 7. However it is preferable in accordance with the working embodiment to provide each actuating portion 24a and 25a with its own actuating face 24b and 25b.

Figure 8:
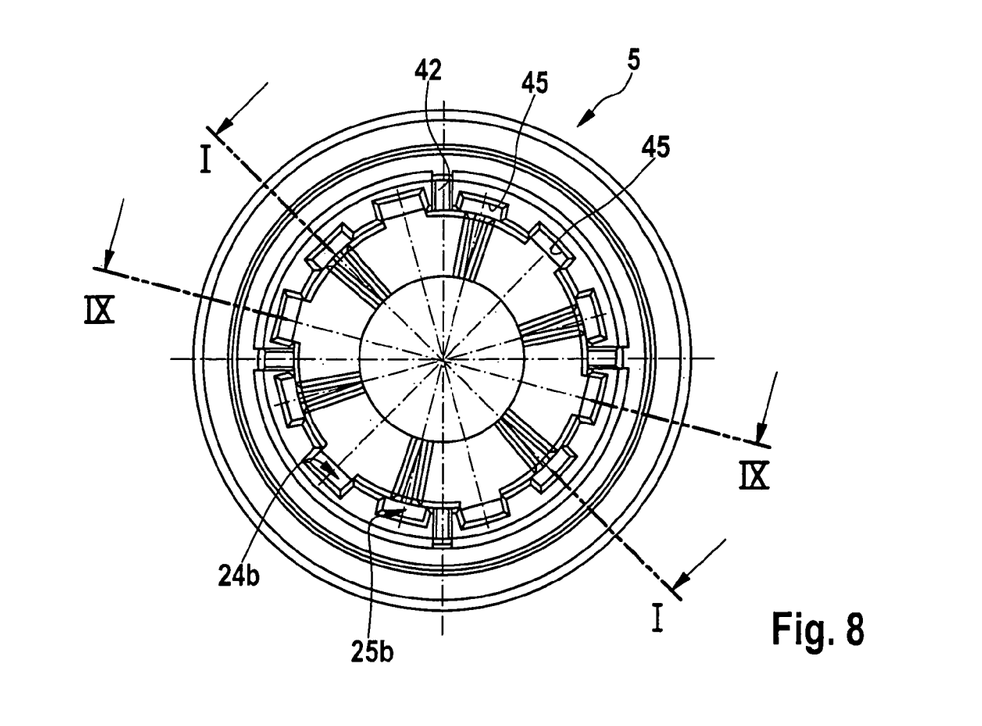
FIG. 8 is an end-on view of the actuating sleeve as seen from the collet side and looking in the direction of the arrow VIII in FIG. 7.

In the particular embodiment this is ensured because for each actuating portion 24a and 25a there is a guide groove 45 extending axially on the inner periphery of the actuating sleeve 5, into and along which the associated actuating portion 24a and 25a slides on axial displacement of the actuating sleeve 5 and whose floor constitutes the respective actuating face 24b and 25b. Owing to the engagement of the actuating portions 24a and 25a in the guide grooves 45 there is furthermore a means preventing turning of the actuating sleeve 5 in relation to the collet 4, something which results in prevention of rotation in relation to the main body 1, when the collet 4 is secured to the main body 1 in a manner avoiding relative turning.

It is an advantage, when the actuating sleeve 5 is in the non-actuated position, for the first actuating faces 24b to be arranged at a greater distance "x" from the first actuating portions 24a associated with them than the axial distance "y" between the second actuating faces 25b and the second actuating portions 25a associated with them. The consequence of this is that on actuation of the actuating sleeve 5 there is no simultaneous actuation of all gripping teeth 24 and 25 but rather an actuation at different times, i.e. in sequence. In the particular example the actuating sleeve 5 acts, owing to the smaller axial distance of "y" firstly on the second actuating portions 25a and then just after this on the first actuating portions 24a. Accordingly the maximum actuating force necessary for the actuation of the first gripping teeth 24 (in the first tooth group 24') only has to be applied after the second gripping teeth 25 have already undergone maximum deformation. Generally the effect of this is that for the actuation of all gripping teeth 24 and 25 a lower actuation force has to be applied to the actuating sleeve 5 than when all gripping teeth 24 and 25 are simultaneously actuated. Despite having a large number of gripping teeth 24 and 25 in this case the coupling device 10 may be operated with less force being applied.

It is to be observed that the above mentioned different axial spacing is not necessarily limited to two tooth groups. In principle a configuration would be possible such that the gripping teeth 24 and 25 present would be actuated one after the other so that the necessary actuating force would be optimally distributed.

The necessary actuating force is only to be applied in the working example until the inclined portions 43 of the actuating faces 24b and 25b have moved over the associated actuating portions 24a and 25a. Once an actuating portion 24a and 25a is located radially within a straight face portion 44, then in this respect no further axial shifting force need be applied. To this extent the designed must be such that at least some actuating portions 24a or 25a are removed some distance from the straight face portions 44 associated with them, when other actuating portions 24a and 25a have already arrived in the vicinity of the straight face portions 44 associated with them.

At least some and preferably all support arms 23 preferably have in each case at least two axially spaced gripping teeth 24 and 25. A design with just two gripping teeth 24 and 25 per support arm 23 has been shown to be best as regards simplicity of manufacture and satisfactory function. In accordance with the working example on each support arm 23 a gripping tooth 24, belonging to the first tooth group 24', with an associated first actuating portion 24a may be provided and furthermore also a second gripping tooth 25, belonging to the second group 25', including the second actuating portion 25a allotted thereto.

Preferably the first gripping teeth 24 are arranged as an axial extension of the respective support arm 23 bearing them at its free end, in particular with the intermediate positioning of the associated actuating portion 24a. The second gripping tooth 25 is seated axially between the first gripping tooth 24 and the base portion 22, but however is preferably arranged laterally on the support arm 23 so that in the peripheral direction 46, indicated by a double arrow, of the collet 4 there is a certain offset of the first and second gripping teeth 24 and 25 positioned on one and the same support arm 23.

The laterally arranged second gripping tooth 25 is in this case more particularly secured on the side of the support arm 23 by means of a connecting rib 47 extending in the above mentioned peripheral direction 46. The connecting rib 47 allows a relatively large transverse spacing of the second gripping tooth 25 from the support arm 23 to be maintained so that, as considered in the axial direction in accordance with FIG. 4, there is only a small degree of covering over from the side or in some cases no covering over of the first and second gripping teeth 24 and 25 arranged on the same support arm 23.

Owing to the connecting rib 47 it is more particularly possible for such a transverse spacing or distance of the second gripping tooth 25 to be set that the gripping tooth 25 assumes a position exactly in the middle between the two first gripping teeth 24 in front of it, of which one belongs to the same support arm 23 and the other belongs to the adjacent support arm 23.

As shown in FIG. 4 without any mutual obstruction of the gripping teeth 24 and 25 in this manner it is possible to arrange for an engagement right the way around the inserted fluid line 12.

The second gripping tooth 25 is held on the respective connecting rib 47 in particular with the intermediate placement of the associated actuating portion 25a.

The collet 4 is preferably in particular in the form of an integral stamped and bent component of metal. FIG. 6 shows the collet 4 in the sheet metal part in the working embodiment as the collet 4 prior to bending and just as stamped from flat material. It will be seen that here inter alia there is the annular base portion 22, which preferably is circumferentially complete and not interrupted in order to ensure an optimum supporting action for the seal 17. The bracing or clamping function as explained of the collet 4 would however also be possible with a base portion 22 slotted at some point on its periphery.

FIG. 2 indicates that the base portion 22 in the form of an annular disk has a respective window 52 at the foot portions 48, extending from this point, of the curved support arms 23. When axially offset gripping teeth 24 and 25 are respectively arranged on one and the same support arm 23, a relatively large number of gripping teeth 24 and 25 may be produced with a relatively small number of support arms 23 so that the number of windows 52 remains low. This improves the supporting action for the seal 17.

It is also to be mentioned that the first and second actuating portions 24a and 25a arranged on first and the same support arm 23 preferably point in opposite directions. The first actuating portions 24a extend from the support arm 23 toward the side opposite to the base portion 22, whereas the second actuating portions 25a extend from the connecting rib 47 carrying them toward the base portion 22.

The main body 1 preferably consists of metal and in particular of aluminum material. The actuating sleeve 5 is more particularly in the form of a plastic component or a precision casting of stainless steel.

The invention claimed is:

1. A coupling device for a fluid line comprising: a collet bearing against a main body axially and into which a fluid line is coaxially inserted, the collet having a plurality of axially extending support arms distributed in a peripheral direction, and an annular base portion from which all the support arms extend in the same direction and each support arm bearing a plurality of radially inwardly extending gripping teeth, wherein at least one first gripping tooth on each support arm is actuated by a first actuating portion of the support arm and at least one second gripping tooth on each support arm is actuated by a second actuating portion of the support arm,
   said first and second actuating portions being actuated by first and second groups of actuating faces, respectively, which are disposed on an actuating sleeve arranged around the collet, the actuating faces engaging the actuating portions upon axial displacement of the actuating sleeve in a shifting direction in order to thrust the gripping teeth radially inward to clamp the gripping teeth against the outer periphery of the inserted fluid line,
   wherein the first and second actuating portions are axially spaced from each other, and the first and second groups of actuating faces are circumferentially and axially spaced from each other such that upon axial displacement of the actuating sleeve at least one second actuating portion is engaged by one of the actuating faces in the second group of actuating faces after at least one first actuating portion has been engaged by one of the actuating faces in the first group of actuating faces, such that both first and second gripping teeth are clamped against the inserted fluid line; and
   wherein the plurality of gripping teeth include a first group of gripping teeth extending from an end of the support arm opposite the base portion and a second group of gripping teeth extending from an end of a mounting portion which is secured to a side of the support arm by a connecting rib which laterally extends from the support arm between the first group of gripping teeth and the base portion, the mounting portion being transverse to the connecting rib.

2. The coupling device as set forth in claim 1, characterized in that on the collet the first and second axially spaced tooth groups are provided each having several gripping teeth lying at the same axial level, the first and second tooth groups being provided with their own respective first and second actuating portions, whose axial spacing from the actuating faces of the actuating sleeve being so selected that the gripping teeth of the two tooth groups are actuated in a timed sequence on displacement of the actuating sleeve, the gripping teeth belonging to the same tooth group experiencing simultaneous actuation.

3. The coupling device as set forth in claim 1, characterized in that each gripping tooth on the collet is provided with its own actuating portion in an individual manner.

4. The coupling device as set forth in claim 1, characterized in that each actuating portion is provided individually with its own actuating face arranged on the actuating sleeve.

5. The coupling device as set forth in claim 4, characterized in that for each actuating portion on the inner periphery of the actuating sleeve an axially extending guide groove is present, along and in which the associated actuating portion slides during axial displacement of the actuating sleeve and whose groove floor constitutes the actuating face.

6. The coupling device as set forth in claim 1, characterized in that the actuating faces have a face portion slanting in relation to the direction of displacement of the actuating sleeve.

7. The coupling device as set forth in claim 6, characterized in that each slanting face portion is followed by a straight face portion of the associated actuating face which is parallel to the direction of displacement of the actuating sleeve.

8. The coupling device as set forth in claim 1, characterized in that each gripping tooth is joined by way of a connecting portion, individually associated with it, in a resiliently elastic manner on the associated support arm.

9. The coupling device as set forth in claim 8, characterized in that the actuating portions are constituted by the connecting portions.

10. The coupling device as set forth in claim 1, characterized in that the actuating portions extend radially outward past the support arms.

11. The coupling device as set forth in claim 1, characterized in that the actuating portions have an angular shape with a radially outwardly directed ridge portion.

12. The coupling device as set forth in claim 1, characterized in that the actuating sleeve is able to be axially slid in relation to the collet and on the actuating sleeve detent means are present, which provide a releasable detent connection between the collet and the actuating sleeve, when the latter has been shifted into an actuated position terminating the clamping action.

13. The coupling device as set forth in claim 12, characterized in that the actuating portions have an angular shape with a radially outwardly directed ridge portion, wherein the detent means have detent recesses arranged at the inner periphery of the actuating sleeve, such recesses cooperating with detent projections formed by the ridge portions of the actuating portions.

14. The coupling device as set forth in claim 1, characterized by gripping teeth on the collet arranged with an axial clearance between them, and by actuating faces on the actuating sleeve arranged with an axial clearance between them for acting on the actuating portions of axially spaced gripping teeth.

15. The coupling device as set forth in claim 1, characterized in that each support arm bears at least two gripping teeth spaced apart in the longitudinal direction of the collet.

16. The coupling device as set forth in claim 1, characterized in that the gripping teeth arranged on the same support arm are placed in relation to each other with an offset in the peripheral direction of the collet.

17. The coupling device as set forth in claim 1, wherein all gripping teeth are placed axially to the fore of the base portion with a clearance.

18. The coupling device as set forth in claim 17, characterized in that the collet is so disposed on the main body that the support arms extend, starting at the base portion opposite to the insertion direction of the fluid line axially outwardly.

19. The coupling device as set forth in claim 17, characterized in that the collet has at least its base portion disposed in a socket in the main body communicating with a fluid duct.

20. The coupling device as set forth in claim 19, characterized in that the base portion axially supports a sealing ring, which is coaxial to it and which is disposed in the main body on the side of the base portion which is axially opposite to the support arms.

21. The coupling device as set forth in claim 17, characterized in that the collet has its base portion axially firmly anchored on the main body.

22. The coupling device as set forth in claim 1, characterized in that the actuating sleeve is borne on the main body in an axially sliding fashion.

23. The coupling device as set forth in claim 1, characterized in that the actuating portion is in the form of a stamped and bent metal component.

24. The coupling device as set forth in claim 1, characterized in that the main body is constituted by an individual component provided with attachment means or is constituted by the wall of a fluid power implement.

25. The coupling device as set forth in claim 1, wherein the first actuating portion extends in a first direction and the second actuating portion extends in a second direction being different than the first direction.

26. The coupling device as set forth in claim 1, wherein the first actuating portion is axially spaced in the shifting direction from the second actuating portion.

27. The coupling device as set forth in claim 1, wherein the first actuating face is axially spaced in the shifting direction from the second actuating face.

\* \* \* \* \*